Nov. 30, 1943.   R. SAULNIER   2,335,451
CONSTRUCTION OF WELDED TANKS AND OTHER STRUCTURES
Filed Feb. 13, 1942

Inventor
R. Saulnier
By Glascock Downing Nichols
Attys

Patented Nov. 30, 1943

2,335,451

UNITED STATES PATENT OFFICE 2,335,451

CONSTRUCTION OF WELDED TANKS AND OTHER STRUCTURES

Raymond Saulnier, Paris, France; vested in the Alien Property Custodian

Application February 13, 1942, Serial No. 430,822
In France May 15, 1940

4 Claims. (Cl. 29—148.2)

The present invention relates to the construction of hollow structures such as tanks and the like, in which various elements are assembled by welding.

The object of the invention is to provide a method of construction of structures of this kind, which is better adapted to meet the requirements of practice than the methods used for the same purpose up to the present time, and in particular which permits of improving fluidtightness and localizing any possible leakage.

Other objects of the present invention will result from the following detailed description of some specific embodiments thereof.

Preferred embodiments of the invention will be hereinafter described, with reference to the accompanying drawing given merely by way of example and in which.

Figure 1:
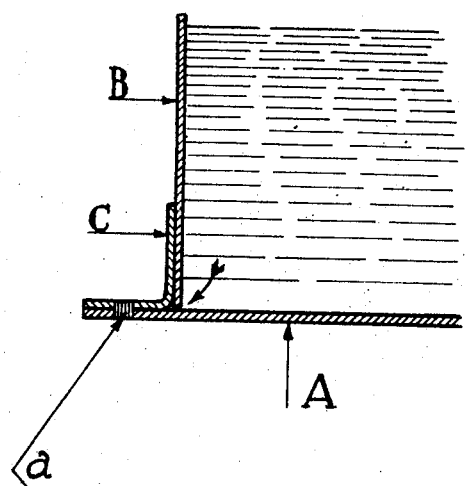
Fig. 1 is a vertical sectional view of an angle of a welded tank made according to the invention.
Figure 3:
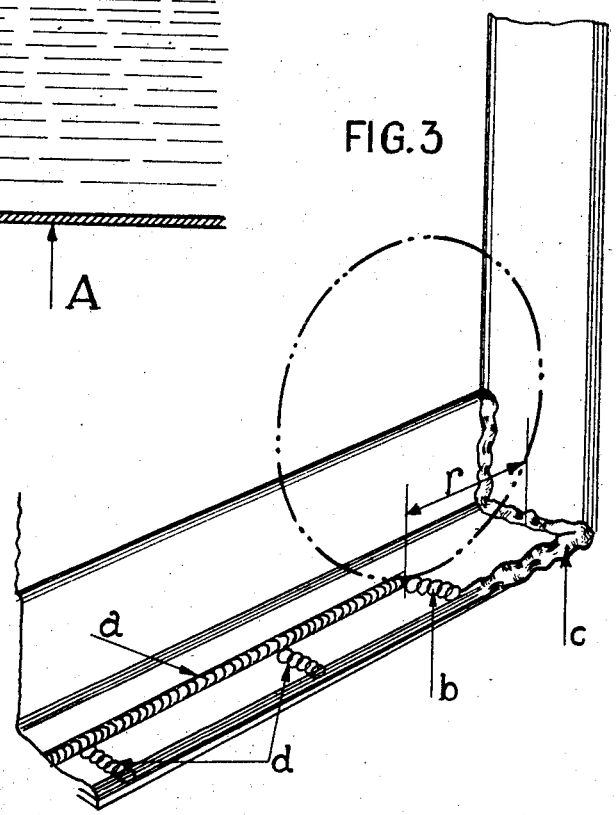
Fig. 3 is a perspective view of an angle of this tank.

In the drawing, reference character A designates the bottom of the tank, assembled with the vertical wall B thereof through an angle iron C. The parts are secured together in a fluidtight manner by electric welding as follows:

The angle irons C are fixed over their whole length to the vertical side B by a continuous weld before the bottom A is fixed. The bottom is placed on the angle irons such as C; then it is welded thereon by a continuous weld line $a$ up to a distance $r$ from the end, this distance being substantially equal to the radius of the welding wheel or roller shown in dash and dot lines in Fig. 3.

In order to avoid leakage in this angle, the end of the weld line $a$ is extended as far as the edge of angle iron C and of bottom plate A, so as to form a weld $b$ constituted by a close juxtaposition of weld spots. The assembly is finished by an arc welding $c$ of the edges of the angle iron and of the bottom plate.

However, if there are porous portions in weld $a$, they cause a leakage which can be stopped only by welding the edges of the angle iron and of the bottom plate together over their whole length.

Figure 2:
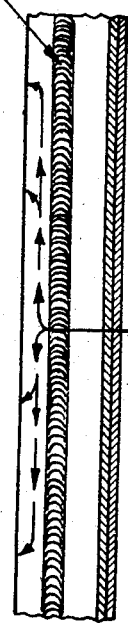
Fig. 2 is a horizontal sectional view of the lower edge of the tank of Fig. 1.

This results from the fact that the liquid which leaks out through the porous portion of the weld flows between the weld line and the edge of the angle iron and the bottom plate to a distance which depends upon the manner in which the lips of said angle iron and said bottom plate have been applied against each other, that is to say until this liquid finds passage toward the outside, as shown by the arrows of Fig. 2.

According to the present invention, the welding operation includes, in addition to the operations above stated, a further welding operation which is intended to limit and localize leakage and therefore facilitates its subsequent elimination.

This supplementary operation consists in connecting the weld line $a$ to the edges of the angle iron C and the bottom plate A by weld lines $d$ made of a close juxtaposition of weld spots. Thus, if there is a porous portion in weld line $a$, leakage is necessarily limited to the interval between two consecutive weld lines $d$ and it then suffices, in order to stop this leakage, to weld together the edges of angle iron C and bottom plate A, thus obtaining perfect fluidtightness.

It should be well understood that this method applies also to the case in which the side wall B of the tank has a folded edge adapted to be welded to the bottom plate A without interposition of an angle iron such as C.

While I have, in the above description, disclosed what I deem to be efficient and practical embodiments of the present invention, it should be well understood that I do not wish to be limited thereto, as there might be changes made in the arrangement, disposition and form of the parts, without departing from the principle of the invention, as comprehended within the scope of the appended claims.

What I claim is:

1. A hollow structure including a bottom and a vertical side, a flange carried by said vertical side along the lower edge thereof, extending at right angles thereto, a weld line, for fixing said bottom to said flange, located at a distance from the edges of said bottom and said flange respectively and parallel to said edges, and a plurality of weld lines extending between said first mentioned weld line and said edges of the bottom and the flange respectively, at right angles thereto.

2. A hollow structure including a bottom and a vertical side, an angle iron welded to the lower edge of said side so as to form a flange carried by said vertical side along the lower edge thereof, extending at right angles thereto, a weld line, for fixing said bottom to said flange, located at a distance from the edges of said bottom and said flange respectively and parallel to said edges, and a plurality of weld lines extending between said first mentioned weld line and said edges of the bottom and the flange respectively, at right angles thereto.

3. In a tank formed of weldable material and having an upright vertical wall provided with a flange at its bottom which extends from end to end of the wall and also outwardly from the bottom of the wall, and a bottom member for the tank positioned in contact with the bottom of the wall and the bottom of said flange and adapted to be secured to the flange in a position wherein a plurality of edges of the bottom member are each in flush relation to a separate edge of said flange, the method of securing said bottom member to said flange to provide a substantially liquid tight union between said bottom member and the flange and the wall comprising, welding the flange and the bottom member together along a continuous weld line spaced from the long edge of the flange and extending substantially parallel thereto from a location near one of the opposite ends of the flange to a position near the other opposite end thereof while said flange and bottom member are in said flush relation, spot welding the flange to the bottom member along weld lines each of which is joined to a separate end of said first named weld line and extends outwardly at a right angle therefrom to the long edge of said flange, arc welding the long edge of the flange between each spot weld line and the end of the flange nearest thereto and also the edge of the flange at said nearest end to said bottom member, and spot welding the flange to the bottom member along a plurality of relatively closely spaced weld lines each of which is connected to said first named line and each of which extends outwardly to the long edge of said flange and is substantially parallel to said second named weld lines, whereby a leak between the wall and the bottom member will be localized between two adjacent parallel weld lines and may be sealed off by welding the long edge of said flange to said bottom member between the parallel weld lines within the confines of which the leak occurs.

4. A hollow structure as claimed in claim 2 wherein the edges of the angle iron between each parallel weld line nearest each end of the angle iron and that end of the angle iron are connected to the bottom by an arc weld.

RAYMOND SAULNIER.